Figure 1:
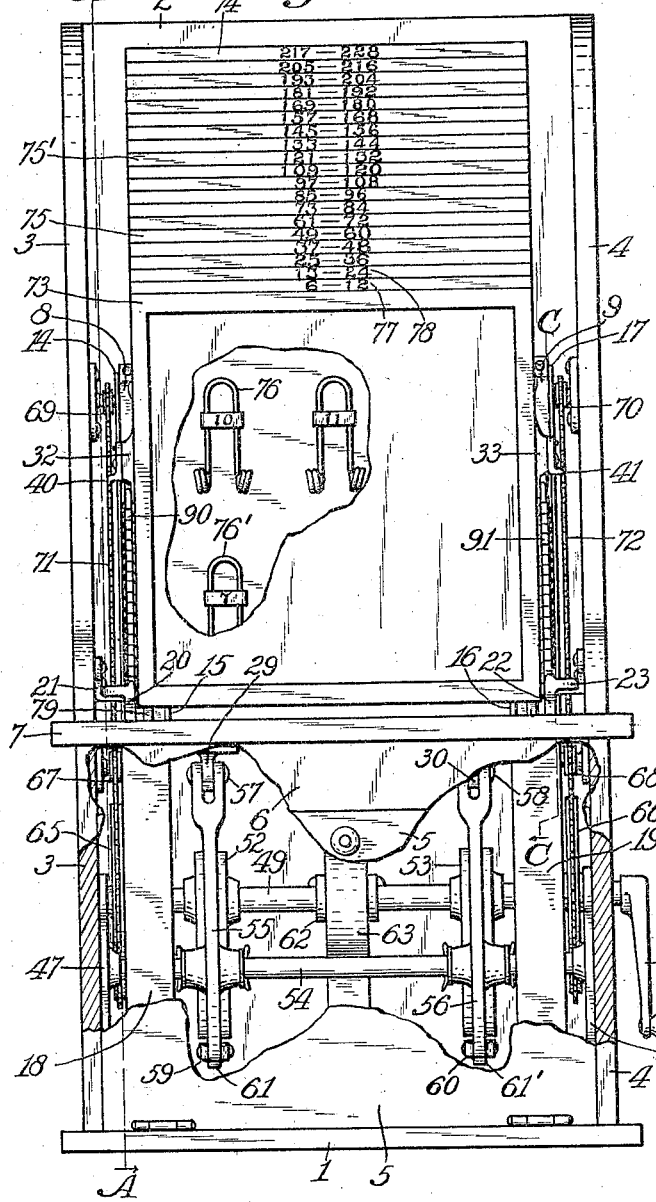

E. T. SILVIUS.
FILING APPLIANCE.
APPLICATION FILED FEB. 4, 1914.

1,299,247.

Patented Apr. 1, 1919.
4 SHEETS—SHEET 1.

WITNESSES:
J. H. Gardner
M. E. Sparrow

INVENTOR:
Ellis T. Silvius.

E. T. SILVIUS.
FILING APPLIANCE.
APPLICATION FILED FEB. 4, 1914.
1,299,247.
Patented Apr. 1, 1919.
4 SHEETS—SHEET 2.
Fig. 4.
Fig. 5.
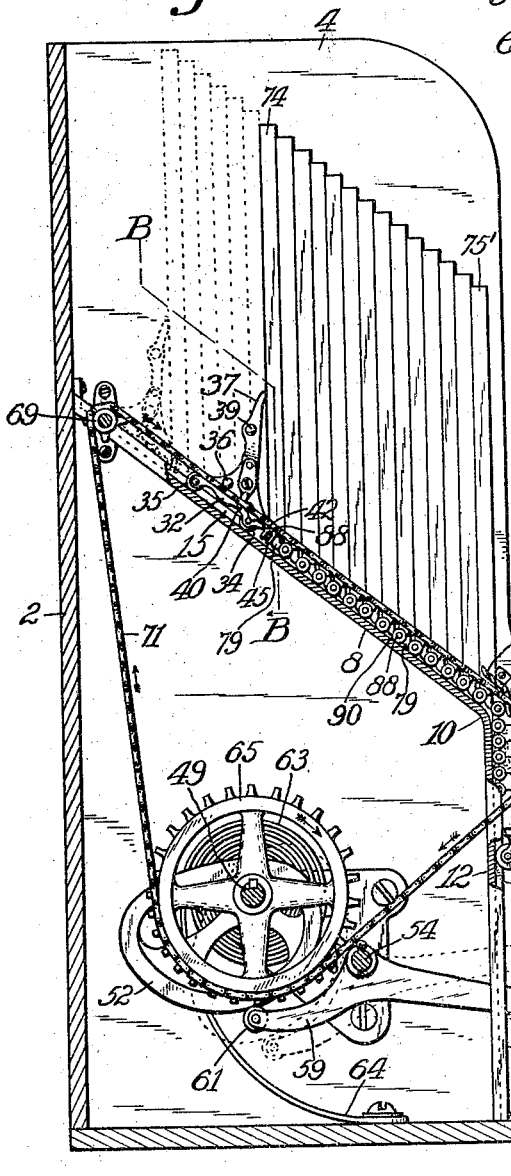
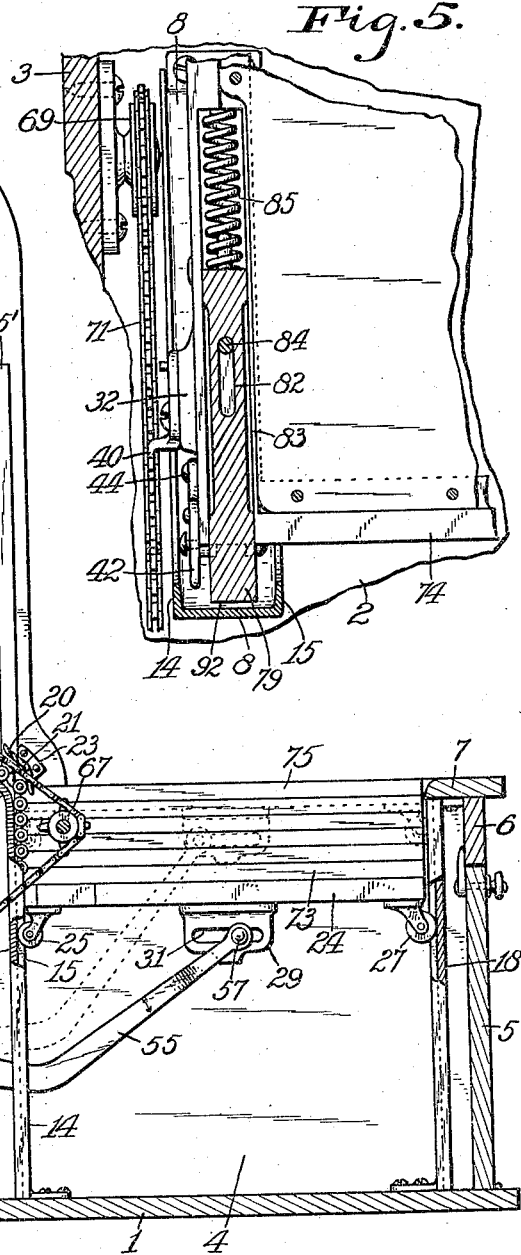
WITNESSES:
J. H. Gardner
M. E. Sparrow
INVENTOR:
Ellis T. Silvius

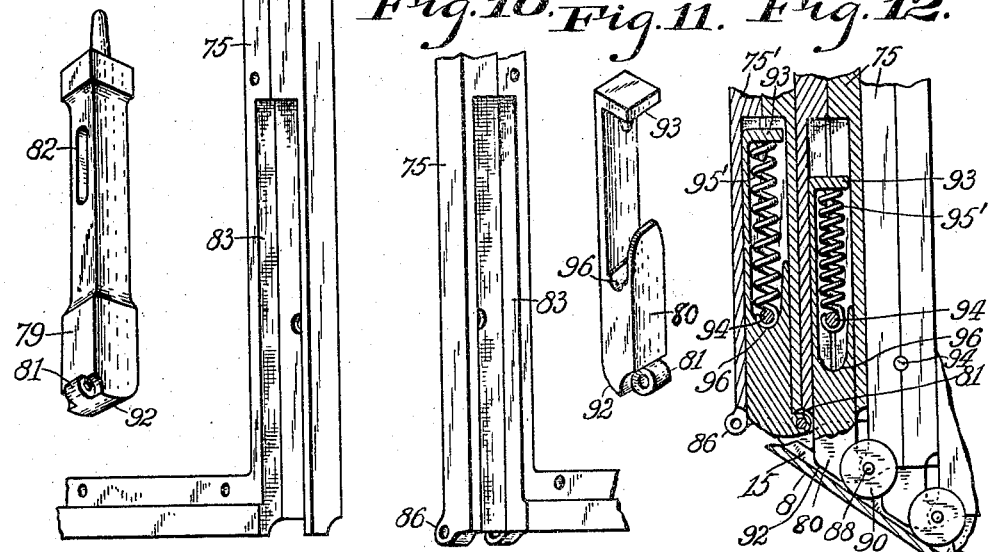

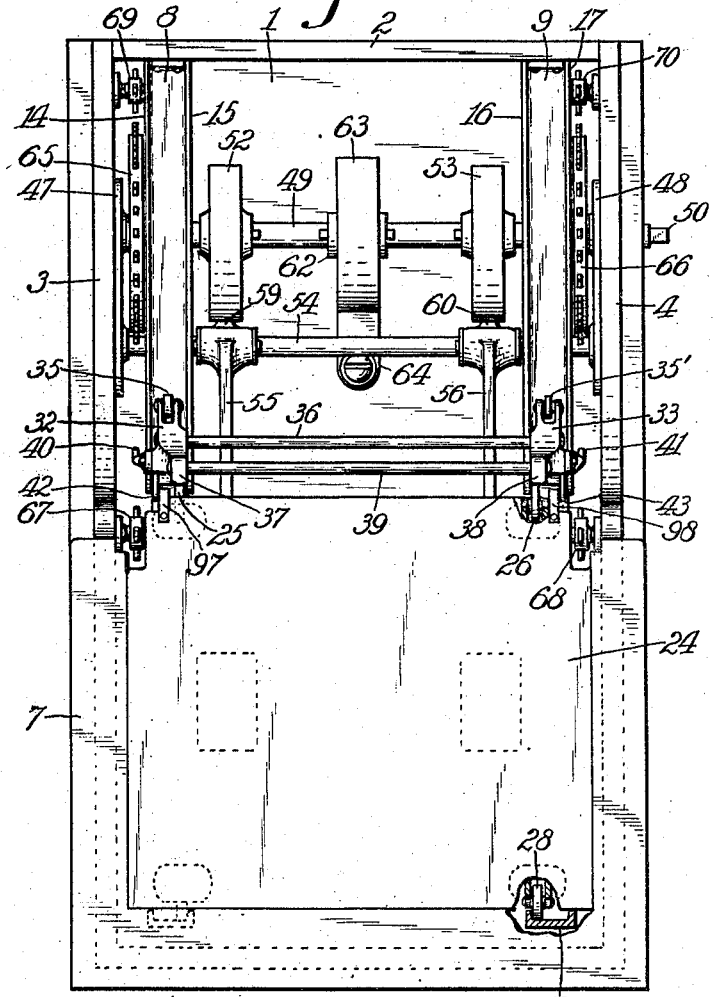
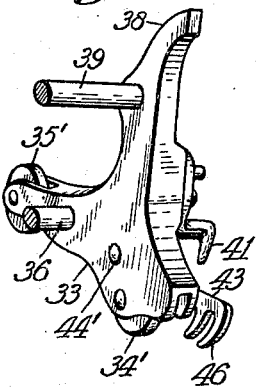
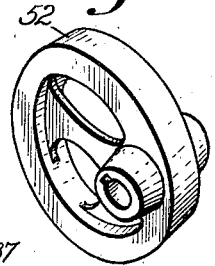
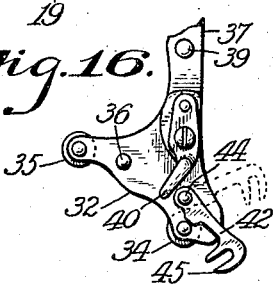

UNITED STATES PATENT OFFICE.

ELLIS T. SILVIUS, OF INDIANAPOLIS, INDIANA, ASSIGNOR, BY MESNE ASSIGNMENTS, TO THE McCASKEY REGISTER COMPANY, (INCORPORATED IN 1914,) OF ALLIANCE, OHIO, A CORPORATION OF OHIO.

FILING APPLIANCE.

1,299,247.   Specification of Letters Patent.   Patented Apr. 1, 1919.

Application filed February 4, 1914. Serial No. 816,420.

*To all whom it may concern:*

Be it known that I, ELLIS T. SILVIUS, a citizen of the United States, residing at Indianapolis, in the county of Marion and State of Indiana, have invented a new and useful Filing Appliance, of which the following is a specification, reference being had to the accompanying drawings and to the letters and figures of reference marked thereon.

The invention relates to means for systematically preserving and handling commercial papers in the course of business, the invention having reference more particularly to a filing appliance or cabinet especially adapted for holding credit account records or bill-slips and in a convenient manner, so that the papers shall be conveniently accessible.

An object of the invention is to provide an improved filing cabinet or credit account register that shall be so constructed as to permit the use of a relatively large number of filing leaves or frames and normally in echelon or stepped relation, and to permit the leaves or frames to be collocated in a rectangular pack when moved forward out of the way so that other leaves or frames may be accessible. Another object of the invention is to provide a smoothly operating filing cabinet of large capacity and means for controlling the operation of the filing leaves or frames. A still further object is to provide improved means for supporting the filing leaves or frames in echelon in a simple and inexpensive manner, without entailing the troubles that may arise incidentally to the employment of springs for supporting considerable weight, and enabling filing leaves or frames having shiftable hinge connections to assume a rectangular pack when moved to prone position without requiring large and cumbersome guides in the cabinet for forcing the leaves to collocate them in a rectangular pack.

With the above mentioned and other objects in view, the invention consists in a filing appliance or credit account register adapted to contain a relatively large number of accounts or separate groups of papers, the appliance or register having a plurality of filing leaves or frames adapted for holding papers systematically and normally arranged in echelon or stepped relation upon an inclined guide and movable therefrom to approximately horizontal position, the leaves or frames being provided with hinging connections adapted to permit longitudinal movement of the leaves relatively to adjacent leaves or the axes of rotation of the respective leaves to permit the stepping of the leaves in normal position and also permitting the leaves to be formed into a rectangular pack not only in their casing but in a safe depository, the invention consisting further in providing means for stopping and holding the leaves when moved downward on the inclined guide to enable the hinging connections to automatically move the leaves relatively to their axes of rotation as the leaves are moved from normal or prone position, in order to collocate the leaves in a rectangular pack. The invention also consists further in the novel parts and in the combinations and arrangements of parts as hereinafter particularly described and claimed.

Figure 2:
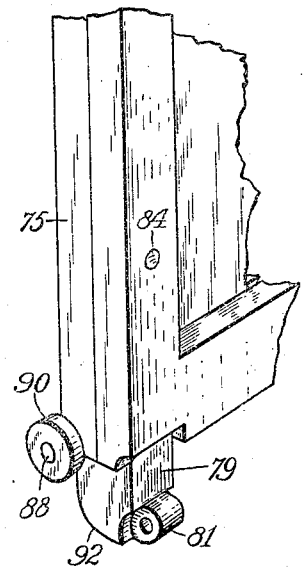
Figure 3:
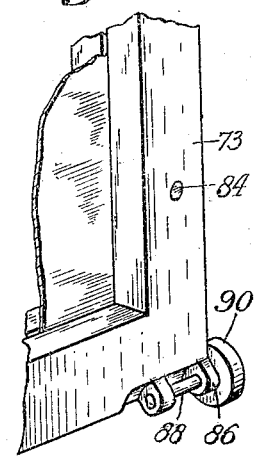

Referring to the drawings, Figure 1 is a front elevation of the improved filing appliance or credit account register partially broken away to expose internal features thereof; Fig. 2, a fragmentary front perspective of one of the filing leaves; Fig. 3, a fragmentary rear perspective of the leaf; Fig. 4, a vertical section approximately on the line A A in Fig. 1 showing some of the leaves in prone position; Fig. 5, a fragmentary section approximately on the line B B in Fig. 4; Fig. 6, a fragmentary section approximately on the line C C in Fig. 1; Fig. 7, a fragmentary section showing the leaves in different positions as when being moved from normal to prone position, as on the line C C in Fig. 1; Fig. 8, a perspective view of one of the hinging elements of the leaves preferably employed; Figs. 9 and 10, fragmentary perspective views of detached portions of a leaf; Fig. 11, a perspective view of a modified form of hinge connections; Fig. 12, a fragmentary sectional elevation as on the line A A in Fig. 1 illustrating the modified hinge connections; Fig. 13, a top plan of the filing cabinet or register minus the filing leaves or frames and parts of the controlling device thereof; Fig. 14, a fragmentary perspective view showing a portion of a traveling head or abutment preferably employed; Fig. 15, a perspective view of a cam which is advantageously employed in conection with the invention, and Fig. 16 is a fragmentary side elevation of the traveling head or abutment.

Similar reference characters in the various figures of the drawings indicate corresponding elements or features of construction herein referred to.

A practical embodiment of the invention comprises a casing which is subject to variation as to size and various details, and as shown it comprises a bottom 1 on the rear end of which is a suitable back 2, two side parts 3 and 4 being connected to the bottom and the back, the rearward portion of the side parts, and also the back, extending upward to a higher plane than the forward portions of the side parts. A door 5 is hinged to the forward portion of the bottom 1 and extends up to a front part 6 which is connected to the forward portions of the side parts 3 and 4. An open marginal frame 7 is secured upon the forward portions of the side parts and also to the front part 6.

An important feature of the invention includes an inclined platform or guide which preferably comprises two guide-bars 8 and 9 which are secured at one end of the back 2 and extend downward approximately to the plane of the frame 7 at a suitable inclination, the bars having downwarly extending curved portions 10 and 11 at their lower ends. Two upright guides 12 and 13 are secured to the bottom 1 and extend upward toward the plane of the frame 7 and preferably are integrally connected respectively to the curved guide portions 10 and 11 so as to conveniently support the lower ends of the guides 8 and 9 which preferably are continuous with the upright guides. The guides preferably are composed of channeled iron sections, so that they have side guide flanges 14 and 15, and 16 and 17 respectively. Two similar vertical guides 18 and 19 are secured to the bottom 1 and extend upward in proximity to the door 5 to the frame 7. Preferably a curved guide 20 provided with a supporting bracket 21 is arranged above the curved portion 10, the bracket being secured to the side part 3, a companion curved guide 22 having a bracket 23 which is secured to the side part 4 whereby the guide is supported above the curved guide portion 11, said curved guides 20 and 22 extending upward a short distance above the guide-bars 8 and 9 and downward forwardly of the curved portions 10 and 11 respectively.

In order to support the leaves or frames when in prone position with the uppermost one of the prone leaves on the plane of the frame 7, a movable table 24 is suitably guided so that it may be moved up or down and preferably is provided with guide rollers 25 and 26 that are in contact with the upright guides 12 and 13 and similar rollers 27 and 28 in contact with the guides 18 and 19, respectively. Preferably the under side of the table is provided with two bearing blocks 29 and 30, each block having a horizontal guideway 31 extending longitudinally therein.

For the purpose of controlling the leaves or frames when in upright position a traveling head or abutment of novel construction is provided and it comprises two carriages 32 and 33, one of which is provided with two rollers or wheels 34 and 35 and the other with similar rollers 34' and 35' whereby the respective carriages are movably mounted upon the guide-bars 8 and 9, a tie-bar 36 being secured to the two carriages and holding them at the proper distance apart. The carriages are provided with upward extending arms 37 and 38 respectively, and they preferably are secured to a tie-bar 39. The carriages, as will be seen, operate on an inclined plane, and the arms extend upward at an oblique angle to the inclined plane. The outer sides of the carriages are provided with lugs 40 and 41 respectively, and also with coupling-rods 42 and 43 connected to the carriages by means of pivots 44 and 44' respectively, the bars having hooks 45 and 46 thereon respectively whereby to connect the carriages to the rearmost one of the filing leaves or frames.

Two frame members 47 and 48 of suitable form are fixedly supported in the casing, preferably on the inner faces of the side parts 3 and 4 respectively, and they rotatably support a shaft 49 which extends through one of the side parts and has a squared end portion 50 to which a crank arm 51 is connected for rotating the shaft. Two suitably shaped cams 52 and 53 are secured to the shaft 49 to be rotated thereby. A pivotal shaft 54 is suitably supported parallel to the shaft 49, preferably by means of the frame members 47 and 48. Two suitable levers are provided and supported between their ends on the shaft 54, the levers having long forward portions or arms 55 and 56 that extend under the table 24 and are provided with bearing pins 57 and 58 respectively that have movable contact in the slots of the bearing blocks 29 and 30 respectively, the levers having relatively short rearwardly extending portions or arms 59 and 60 that are provided with bearing rollers 61 and 61' respectively that are in contact with the under portion of the two cams 52 and 53 respectively. The cams are so designed as to contour that they shall cause the levers to move on their pivotal support and elevate the table 24, the table descending by the force of gravity and therefore holding the rollers of the levers in contact with the cams. In order to rotate the shaft 49 in one direction, a hub 62 is secured to the shaft, and a spring 63 is wound about the hub and suitably connected at its inner end to the hub, the outer end of the spring being suitably secured to the bottom 1 or otherwise anchored to the casing. Two sprocket wheels 65 and 66 are secured also to the shaft 49. Two guide wheels 67 and 68 are suitably mounted on the inner sides of the side parts 3 and 4 respectively forward of the guides 12 and 13, two similar guide wheels 69 and 70 being mounted adjacent to the back 2 and the upper ends of the guide-bars 8 and 9. A sprocket chain 71 extends about the wheel 65 and the guide wheels 67 and 69 and is connected to the lug 40 of the traveler, a similar chain 72 extending about the wheel 66 and the wheels 68 and 70, being connected to the lug 41.

A suitable number of filing leaves or frames are provided and are normally arranged uprightly in echelon upon the two guide bars 8 and 9 constituting the inclined platform, there being illustrated a front leaf 73, a rear leaf 74, and a relatively large number of intermediate leaves 75, 75'. The leaves are provided with suitable means such as bill holding clamps 76, 76', or other means whereby papers or bill slips may be secured to the leaves. The leaves are provided with suitable hinging connections at their normal lower ends whereby the leaves are enabled to be arranged face to face and to move pivotally or rotatably each relative to the other and permitted to move also longitudinally or toward or from the axis of the respective leaves, so that the leaves may be arranged with the upper portions projecting higher than the next adjacent forward leaves in order to expose to view the indexing characters 77, 78, which are commonly placed on the front of the upper portion of the leaves. The hinging connections may be variously constructed, a convenient form comprising hinge-bars 79 or 80, of which each leaf is provided with two, although if desired the front leaf may be devoid of them. Each hinge-bar is provided with a hinging ear 81, and in one arrangement the hinge-bar is provided with a longitudinal slot 82, the hinge-bar being movably guided longitudinally in a guideway 83 formed in the leaf, the leaves being built up of sections and having two guideways in the two side portions respectively thereof, and a stop-pin 84 is inserted in the leaf and extends through the slot 82 for limiting the movement of the hinge-bar relative to the leaf. In some cases a coil spring 85 is seated at the upper end of the guideway and upon the inner end of the hinge-bar so as to normally hold the hinge-bar outward in order to support the leaf at a distance from its pivot, but in some cases the leaf may be supported in normal position directly by the inclined guide-bar, the spring in such a case being desired only for the purpose of preventing loose movement of the hinge-bar in the leaf. The rear side of each leaf is provided with hinging ears 86 and 87 that are connected to the hinging ears 81 of the hinge-bars of the next rearward adjacent leaf by means of pivot pins 88 and 89 respectively which preferably extend outward beyond the sides of the leaves and have rollers or wheels 90 and 91 thereon respectively which directly roll upon the inclined guide-bars 8 and 9 for directly supporting the leaves, and in some cases the rollers may have contact with the upright guides 12 and 13. The hinge-bars 79 have rounded lower ends 92 so that they may slide upon the guide-bars if desired, in which case the rollers may be omitted and the leaves will be supported on the guide-bars by means of the springs 85, the two springs, however, being only sufficiently strong to yieldingly support one leaf.

In some cases the springs 85 may be omitted and the hinge-bars may be slightly modified and recessed so that a spring seat 93 is formed so as to face downward, and a stop-pin 94 is inserted in the leaf so as to extend through the recess in the hinge bar and normally in contact with a seat 96 formed at the lower end of the recess, in which case a spring 95' is seated upon the stop-pin and against the under side of the spring seat 93 so as to normally force the hinge-bar and yieldingly hold it in retracted position, as illustrated in Figs. 11 and 12, the spring having only sufficient strength to prevent uncontrolled movement of the hinge-bar.

In some cases the rear portion of the table 24 is provided with bearing seats 97 and 98 to enable the front leaf to turn over smoothly to prone position and also to cause the forward leaf to press rearward by the force of gravity against the next adjacent leaf, in which case the leaves are positioned slightly more to the front than when the front leaf normally rests upon the guide-bars.

In practical use, the papers or bill slips that are desired to be filed and preserved are removably secured on the bill-holding leaves or filing frames, and access thereto may readily be had by moving the leaf or leaves downward and forward onto the table 24 which is automatically adjusted to lower positions as the leaves are successively brought upon it. In order to move the leaves forward the operator turns the crank-arm 51 which obviously moves the controlling chains and also the traveling head or abutment which is connected to the hinge pins or similar pins with which the rear leaf 74 is provided. The rotation of the shaft 49 causes the spring 63 to be put under tension so that the spring is enabled to assist in rotating the shaft in the opposite direction when returning the leaves from prone to upright position and moving the leaves upward on their inclined support, and if desired the spring may be sufficiently strong to accomplish the upward movement of the leaves without power being applied to the crank arm. Each leaf as it arrives at the position normally occupied by the front leaf descends on the rounded portions 10 and 11 of the guide-bars and tilts forward, but being resisted by the atmospheric air the leaf gently falls to prone position upon the table or the leaf already thereon, the table moving downward in synchronism with the forward movement of the leaves. As each leaf turns over forwardly its hinge-bars are guided so that they cannot be forced rearward, while the leaf is caused to move downward or toward the pivot of its hinge bars, due to the fact that the remaining upright leaves are stopped and temporarily held by means of the controlling chains and gearing, so that the relative movement of the leaves so as to form a rectangular pack on the table is automatically accomplished. In case the operator vigorously pulls down the leaves, or any of them, the rearward adjacent leaves may be suddenly lifted from the inclined guide-bars, as illustrated in Fig. 7, but only small movement is permitted until the rollers or wheels come in contact with the guides 20 and 22, which in such case cause the leaves to move downward relative to the pivots of their hinge-bars. In case the rollers 90 and 91 are employed and the front leaf is provided with hinged bars the table may be provided with the two bearing seats 97 and 98 adapted to receive the rollers of the front leaf, and the rollers will then serve as stationary supports for the pivots of the hinge bars. In case the front leaf is not provided with hinge-bars it is obvious that the leaf will be supported by the rollers on the pivots at the rear of the leaf, it being evident that each pair of rollers serve to support not only the rear portion of the leaf but also the hinge-bar of the next adjacent rearward leaf. When it is desired to return the leaves from horizontal to normal position each uppermost one of the prone leaves is slightly lifted by hand and pushed upward toward upright position, the spring tension or power applied to the crank arm completing the movement and drawing the upright leaves rearward while the table rises correspondingly, each succeeding leaf being similarly started upward.

Having thus described the invention, what is claimed as new is—

1. A plurality of normally upright leaves, hinging devices movably connected to the leaves and pivoted to adjacent leaves, and an inclined guide movably supporting the leaves and the devices in echelon.

2. A filing appliance including a guide, a plurality of leaves uprightly arranged in echelon and provided with relatively movable hinging devices having movable support upon the guide and pivotally connected to adjacent leaves.

3. A filing appliance including an inclined guide, a plurality of leaves uprightly arranged in echelon, hinging devices yieldingly supporting the leaves and provided with rollers movably supported upon the guides, the devices being pivotally connected to adjacent leaves.

4. A filing appliance including a plurality of leaves, means for connecting the leaves together for relative longitudinal and pivotal movement, and means for movably supporting the leaves in echelon and guiding them downwardly forward and also downward and causing the relative longitudinal and pivotal movement.

5. A filing appliance including a plurality of filing leaves, adjustable hinging means connecting the leaves together for relative longitudinal and pivotal movement, and an inclined platform for normally supporting the leaves uprightly and causing the longitudinal movement of the leaves each relatively to the other to force the leaves into echelon arrangement.

6. A filing appliance including an inclined guide and a vertical guide integrally connected together, an adjustable table adjacent to the vertical guide, and a plurality of leaves hingedly connected together for relatively longitudinal and pivotal movement and movably supported in echelon upon the inclined guide, the leaves being movable onto the table in contact with the vertical guide.

7. A filing appliance including an inclined supporting platform, a plurality of leaves normally supported uprightly in echelon upon the platform, the leaves being movable on the platform and connected together for relative longitudinal and pivotal movement, and a table adjustably supported on planes beyond the lower end of the platform to receive the leaves when moved longitudinally and pivotally.

8. A filing appliance including an inclined platform, a traveling head movably mounted on the platform and movable downward by force of gravity, a plurality of leaves connected together and supported upon the platform, the leaves being movable downward by force of gravity and connected to the traveling head, and rotary means for controlling the movement of the head on the platform.

9. A filing appliance including an inclined guide, a plurality of leaves normally supported uprightly and movably in echelon upon the guide, pivotal connections between the leaves enabling the leaves to be pivotally moved to prone position to form a rectangular pack, the connections permitting longitudinal movement of the leaves relatively to adjacent leaves, and means for stopping the leaves when moved down the inclined guide and thereby enabling the leaves to automatically move longitudinally as they are moved from upright to prone position.

10. In a filing appliance, the combination of a casing having an inclined platform, a plurality of leaves connected together for relative longitudinal and pivotal movement, and a table adjustably guided in the casing forward of the lower end of the platform to receive the leaves from the inclined platform, with operating and controlling mechanism mounted in the casing and operatively connected with one of the leaves and the table.

11. In a filing appliance, the combination of a plurality of leaves, means for connecting the leaves together and permitting relative longitudinal and pivotal movement of the leaves, means for movably supporting the leaves in upright position to force the leaves into echelon arrangement, adjustable means for supporting the leaves in prone position, actuating means for controlling the movement of the leaves, and means automatically acting, on operation of the actuating means, to adjust the adjustable means for the leaves.

12. In a filing appliance, the combination of a casing having a back and also an inclined platform extending forward and downward from the back, a plurality of leaves movably supported uprightly upon the platform, the leaves being connected together for relative longitudinal and pivotal movement, a traveling head movable upon the platform and connected to the rearmost one of the leaves, and a chain connected to the head, with means connected with the chain for controlling the movement of the head and the leaves upon the inclined platform.

13. In a filing appliance, the combination with an adjustably movable table, actuating and controlling means for the table, a plurality of leaves connected together for relative longitudinal and pivotal movement, and movable operating and controlling connections for the leaves acting in synchronism with the actuating and controlling means, of supporting and guiding means adapted for guiding the leaves to or from the table and adapted also for forcing the leaves to assume echelon arrangement when uprightly supported thereby.

14. In a filing appliance, the combination with an adjustably movable table, a pivotally supported lever for controlling the table, actuating and controlling means for the lever, a plurality of leaves connected together for relative longitudinal and pivotal movement, and movable operating and controlling connections for the leaves acting in synchronism with the actuating and controlling means, of an inclined platform for supporting the leaves in upright position and guiding them to or from the table, the inclination of the platform being adapted to cause the upright leaves to form in echelon arrangement.

15. In a filing appliance, the combination with a plurality of leaves, means for hingedly connecting the leaves together and permitting relatively longitudinal movement of the leaves, a rotatably supported shaft, and means operatively connected with the shaft and one of the leaves for moving and controlling the movement of the leaves, of means adapted for uprightly supporting the leaves movably on an inclined plane and guiding them to or from the lower end of the plane, said means being capable of forcing the leaves to assume echelon arrangement when pivotally moved on their connecting means to upright position.

16. In a filing appliance, the combination with a plurality of leaves, means for hingedly connecting the leaves together and permitting relative longitudinal movement of the leaves, and means for moving the leaves, of an inclined platform for movably supporting and guiding the leaves in upright position adapted to force the leaves to assume echelon arrangement when moved to upright position, the platform having a rounded lower end and a vertical guide extending downward therefrom, whereby the leaves are permitted to automatically move longitudinally relative to their axis of rotation when moved from upright position to form a rectangular pack.

17. In a filing appliance, the combination of a casing provided with a plurality of vertical guides, two of the guides extending upward at an inclination in the casing to constitute inclined supports, an adjustable table guided by the vertical guides, a plurality of leaves having each a pair of hinge-bars adjustably connected thereto and pivotally connected to the adjacent leaves, the hinge-bars having rounded lower ends adapted to normally rest or slide upon the inclined supports, and springs interposed between the hinge-bars and the leaves and holding the leaves in relatively high adjusted positions when uprightly arranged.

18. In a filing appliance, the combination of a casing, a supporting guide mounted in inclined position in the casing, a table adjustably guided forward of the lower end of the guide and provided with two bearing seats adjacent to the end of the guide, and a plurality of leaves hingedly connected together for relative longitudinal movement and normally supported uprightly in echelon upon the guide, the foremost one of the leaves having rollers thereon seated in the bearing seats and permitting pivotal movement of the leaf.

In testimony whereof, I affix my signature in presence of two witnesses.

ELLIS T. SILVIUS.

Witnesses:
M. E. SPARROW,
L. M. PETERSON.

Copies of this patent may be obtained for five cents each, by addressing the "Commissioner of Patents, Washington, D. C."